# (12) United States Patent
Lee et al.

(10) Patent No.: US 9,584,649 B2
(45) Date of Patent: Feb. 28, 2017

(54) METHOD AND APPARATUS FOR ACCESSING BASE STATION BY SERVICE

(71) Applicant: ELECTRONICS AND TELECOMMUNICATIONS RESEARCH INSTITUTE, Daejeon (KR)

(72) Inventors: Seung-Hwan Lee, Daejeon (KR); Jae Su Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/565,569

(22) Filed: Dec. 10, 2014

(65) Prior Publication Data
US 2015/0173045 A1 Jun. 18, 2015

(30) Foreign Application Priority Data
Dec. 17, 2013 (KR) ........................ 10-2013-0157369
Dec. 8, 2014 (KR) ........................ 10-2014-0175328

(51) Int. Cl.
 H04W 72/02 (2009.01)
 H04M 1/725 (2006.01)
 H04W 72/08 (2009.01)
 H04W 48/18 (2009.01)
 H04W 88/06 (2009.01)

(52) U.S. Cl.
 CPC ....... *H04M 1/72563* (2013.01); *H04W 48/18* (2013.01); *H04W 88/06* (2013.01)

(58) Field of Classification Search
 CPC ..... H04W 76/02; H04W 72/04; H04W 28/16; H04W 84/042; H04W 24/00; H04W 28/18
 See application file for complete search history.

(56) References Cited

U.S. PATENT DOCUMENTS

| | | | |
|---|---|---|---|
| 8,346,257 B2 | 1/2013 | Kazmi | |
| 2011/0202641 A1* | 8/2011 | Kahn | H04L 67/322 709/221 |
| 2012/0028643 A1* | 2/2012 | Falchuk | H04W 48/16 455/436 |
| 2013/0102313 A1* | 4/2013 | Tinnakornsrisuphap | H04W 36/22 455/436 |
| 2013/0166731 A1* | 6/2013 | Yamanaka | H04L 41/5067 709/224 |
| 2014/0162648 A1* | 6/2014 | Cui | H04W 48/18 455/435.3 |
| 2015/0296384 A1* | 10/2015 | Sadek | H04W 16/14 455/452.1 |

FOREIGN PATENT DOCUMENTS

| | | |
|---|---|---|
| KR | 10-2005-0066286 A | 6/2005 |
| KR | 10-2010-0072581 A | 7/2010 |

* cited by examiner

*Primary Examiner* — Kashif Siddiqui
(74) *Attorney, Agent, or Firm* — NSIP Law

(57) ABSTRACT

A method and apparatus for a terminal to access a base station in a heterogeneous environment are provided. The terminal acquires RAT (Radio Access Technology) selection criteria based on reference information. Then, the terminal selects, for each service, at least one of multiple transceivers that provide access to the base station according to the RAT selection criteria, and provides the corresponding service by accessing the base station through the selected transceiver.

17 Claims, 14 Drawing Sheets

METHOD AND APPARATUS FOR ACCESSING BASE STATION BY SERVICE

CROSS-REFERENCE TO RELATED APPLICATION

This application claims priority to and the benefit of Korean Patent Application No. 10-2013-0157369 and No. 10-2014-0175328 filed in the Korean Intellectual Property Office on Dec. 17, 2013 and Dec. 8, 2014, the entire contents of which are incorporated herein by reference.

BACKGROUND OF THE INVENTION (a) Field of the Invention

The present invention relates to a method and apparatus for accessing a base station by service in a heterogeneous network environment.

(b) Description of the Related Art

While the standards for the previous communication systems have been individually developed, the concept of multi-RAT (Radio Access Technology), which is a combination of several standards such as LTE (Long Term Evolution), WiFi, etc., and the concept of multi-layers such as macrocell, femtocell, etc, which provides different coverage with a single standard, have emerged in recent years. Hence, the optimum integration and operation of these concepts are under active discussion from the systems point of view.

To optimally configure such a heterogeneous network and provide various services based on various QoSs (Qualities of Services), a block, such as a coordinator or JRRM (Joint Radio Resource Management), is placed at a base station's end or the network's end to integrate the heterogeneous network's radio resources acquired by multiple RATs and manage them in conjunction with each other; however, a user terminal has no functional block for such a function.

One of the important requirements for next-generation mobile communication systems is quality experienced by the user. Quality of experience differs from the conventional QoS, which is given as a system requirement, and involves subjective measurement from the user's perspective. It can be represented by QoE.

The conventional wireless communication systems did not take quality experienced by the user into account, and therefore user complaints about service rose and it was impossible to allocate the most appropriate radio resources reflecting the quality experienced by the user of various services.

SUMMARY OF THE INVENTION

The present invention has been made in an effort to provide a method and apparatus for accessing a base station, which allow a terminal to access the most appropriate base station to enable service provision in a heterogeneous network environment.

An exemplary embodiment of the present invention provides a method for a terminal to access a base station in a heterogeneous network environment. The method includes: acquiring RAT (Radio Access Technology) selection criteria based on reference information; selecting, for each service available on the terminal, at least one of multiple transceivers that provide access to the base station according to the RAT selection criteria; and providing the corresponding service by accessing the base station through the selected transceiver.

The reference information may comprise at least one of QoE (Quality of Experience) information, service category, time, and location.

The QoE (Quality of Experience) information may include QoS (Quality of Service), which describes technical performance factors including at least one of data rate, delay, packet loss, and jitter, and QoP (Quality of Perception), which describes non-technical performance factors.

The reference information may further include information user-related or surrounding environment-related information, and the user-related or surrounding environment-related information comprises at least one of the following: terminal location information, time information, space information, input from functional modules of the terminal, input from a network, direct input form the user, an ID defined during the stage of development of a service application (app), an ID assigned by an app provider's site, an ID arbitrarily allocated to the terminal when downloading and installing an app, input from other service apps, and terminal system information.

The method may further includes acquiring service classification criteria; and classifying services available on the terminal into service groups according to the service classification criteria, and in the selecting of a transceiver, at least one of the multiple transceivers that provide access to the base station is selected for each service group according to the RAT selection criteria.

In the selecting of a transceiver, a transceiver preset for each service group may be selected for access to the base station according to the RAT selection criteria.

The service classification criteria and the RAT selection criteria may be the same.

The providing of a service may include if the service is an app-based service, downloading and installing the app on the terminal or activating the existing app previously installed on the terminal when a condition for app installation or activation occurs; and when a condition for app deletion or deactivation occurs after the installation or activation of the app, deleting the app installed on the terminal or deactivating the activated app.

The condition for app installation or activation and the condition for app deletion or deactivation may include at least either location or time.

In the activating, if the terminal is in a location included in the condition for app installation or activation or the current time corresponds to a time included in the condition for app installation or activation, the app may be downloaded and installed on the terminal, or the existing app may be activated, and in the deactivating, if the terminal is in a location included in the condition for app deletion or deactivation or the current time corresponds to a time included in the condition for app deletion or deactivation, the app may be installed on the terminal is deleted, or the activated app may be deactivated.

Another embodiment of the present invention provides a method for a terminal to access a base station in a heterogeneous network environment. The method includes: acquiring service classification criteria based on reference information; classifying services available on the terminal into service groups according to the service criteria; selecting at least one transceiver preset for each service group; and accessing the base station through the selected transceiver and providing the corresponding service.

The reference information may include at least one of QoE (Quality of Experience) information, service category, time, and location.

The reference information may further include user-related or surrounding environment-related information, and the user-related or surrounding environment-related information comprises at least one of the following: terminal location information, time information, space information, input from functional modules of the terminal, input from a network, direct input form the user, an ID defined during the stage of development of a service application (app), an ID assigned by an app provider's site, an ID arbitrarily allocated to the terminal when downloading and installing an app, input from other service apps, and terminal system information.

Yet, another embodiment of the present invention provides an apparatus for a terminal to access a base station in a heterogeneous network environment. The apparatus include a reference information processor that provides RAT (Radio Access Technology) selection criteria and service classification criteria based on reference information; a service classifier that classifies a plurality of services available on the terminal into service groups based on the service classification standard; a plurality of transceivers that provide access to the base station according to different RATs; and an RAT selector that selects at least one of the transceivers for each service group according to the RAT selection criteria.

The reference information may include at least one of QoE (Quality of Experience) information, service category, time, and location.

The reference information may further include user-related or surrounding environment-related information, and the user-related or surrounding environment-related information comprises at least one of the following: terminal location information, time information, space information, input from functional modules of the terminal, input from a network, direct input form the user, an ID defined during the stage of development of a service application (app), an ID assigned by an app provider's site, an ID arbitrarily allocated to the terminal when downloading and installing an app, input from other service apps, and terminal system information.

The QoE (Quality of Experience) information may include QoS (Quality of Service), which describes technical performance factors including at least one of data rate, delay, packet loss, and jitter, and QoP (Quality of Perception), which describes non-technical performance factors.

The reference information processor may include an information storage unit that stores the reference information; a user interface that receives output values related to the user's response action; and a quality information measurement unit that processes the output values through a preset measurement algorithm to produce QoE (Quality of Experience) information and store the same in the information storage unit.

The information storage unit may store information measured by sensors installed on the terminal as raw data and uses the same as the reference information.

DETAILED DESCRIPTION OF THE EMBODIMENTS

Figure 1:
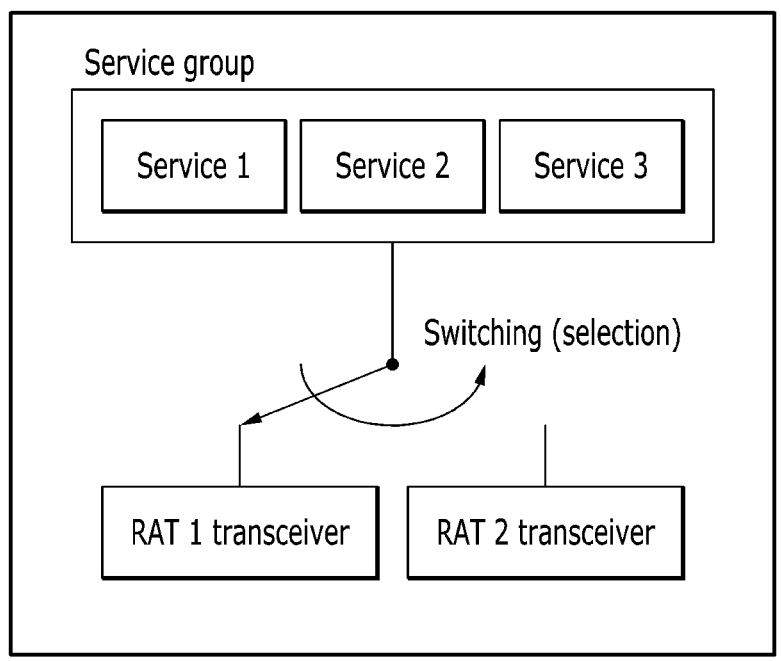
FIG. 1 is a view showing a terminal that is accessing a service over a heterogeneous network in a wireless communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Throughout the present specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), or the like, and may include some or all of the functions of the terminal, the MT, the MS, the AMS, the HR-MS, the SS, the PSS, the AT, the UE, or the like.

In addition, a base station (BS) may include an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, a small base station [such as a femto BS, a home node B (HNB), a home eNodeB (HeNB), a pico BS, a metro BS, and a micro BS], or the like, and may include some or all of the functions of the ABS, the nodeB, the eNodeB, the AP, the RAS, the BTS, the MMR-BS, the RS, the RN, the ARS, the HR-RS, the small base station, or the like.

Further, in a new system structure which is different from the existing concept of base station and terminal such as end-to-end direct communications, a service provider can be defined as the base station, and a service receiver can be defined as the terminal. The terminal includes a service accesser and the base station includes a service provider.

Hereinafter, a method and apparatus for accessing a base station according to an exemplary embodiment of the present invention will be described with reference to the drawings.

For better comprehension and ease of description, the exemplary embodiment has been described with respect to a device, such as a smartphone, that provides a variety of software app-based services, but the present invention is not limited to such a terminal as the smartphone.

FIG. 1 is a view showing a terminal that is accessing a service over a heterogeneous network in a wireless communication system.

In a multi-RAT (Radio Access Technology) or multi-layer heterogeneous network environment where a variety of radio standards and configurations such as LTE (Long Term Evolution), WiFi, etc. exist, if a terminal wants to access a service over a heterogeneous network, it has access through a transceiver (RAT 1 transceiver or RAT 2 transceiver) that provides access via different RATs, and receives one of multiple services (services 1 to 3), as shown in FIG. 1. When accessing a service over a heterogeneous network, service classification according to a specific criterion is not required because service time, location, and category are not taken into account and Quality of Experience information is not used.

In the exemplary embodiment of the present invention, a variety of services under a heterogeneous network environment are classified into service groups according to service classification criteria, and the service groups are connected to a wireless network through one of various RATs according to RAT selection criteria. Meanwhile, even the same service can be connected via different groups to a wireless network through different RATs.

The service classification criteria may include at least one of time, location, service category, and Quality of Experience information, and the RAT selection criteria also may include at least one of time, location, service category, and Quality of Experience information. The RAT selection criteria may be set differently from or the same as the service classification criteria.

For example, a terminal, when using a YouTube video download service, may be configured to use the service over a cellular network in the heart of cities or through one's own WiFi hotspot in areas such as shopping malls where local area networks for special purposes can be set up. In this instance, the criterion for selecting a service RAT may be the terminal's location. That is, a service RAT for a cellular network or a service RAT for WiFi is selected depending on the terminal's location. The example above suggests that both or either of the service classification criteria and the RAT selection criteria can be used when the terminal accesses a heterogeneous network to provide an available service.

The Quality of Experience information can be represented by QoE.

Figure 2:
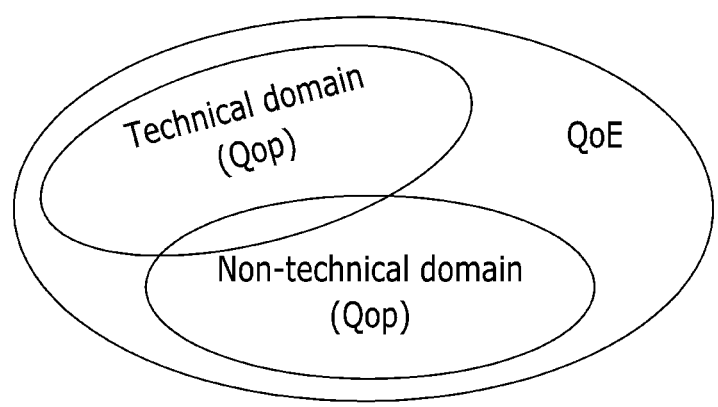
FIG. 2 is a view showing Quality of Experience information according to an exemplary embodiment of the present invention.

FIG. 2 is a view showing Quality of Experience information according to an exemplary embodiment of the present invention.

As shown in FIG. 2, QoE is a subjective level of user satisfaction from the user's perspective of the service provided. QoE includes QoS (Quality of Service), which describes technical performance factors such as data rate, delay, packet loss, and jitter, and QoP (Quality of Perception), which describes non-technical performance factors.

The Quality of Experience information can be measured by direct input from the user or by a variety of sensors or the like. The measured information can be stored as raw data in a database, or processed through a QoP measurement algorithm and stored in a database. In the latter case, output values that a variety of user interface devices the terminal (e.g., smart device) have, such as touch, sound, blow, shake, facial expression, input frequency, etc, may be processed through a QoP measurement algorithm and stored in a database. The measured information about the quality experienced by the user can be used as a service classification criterion or a RAT selection criterion.

The Quality of Experience information is periodically or non-periodically transmitted through a feedback channel upon a network request or as required by the user, and can be used to manage the load of the heterogeneous network, provide management service, and make use of base station resources for Quality of Experience improvement.

Figure 3:
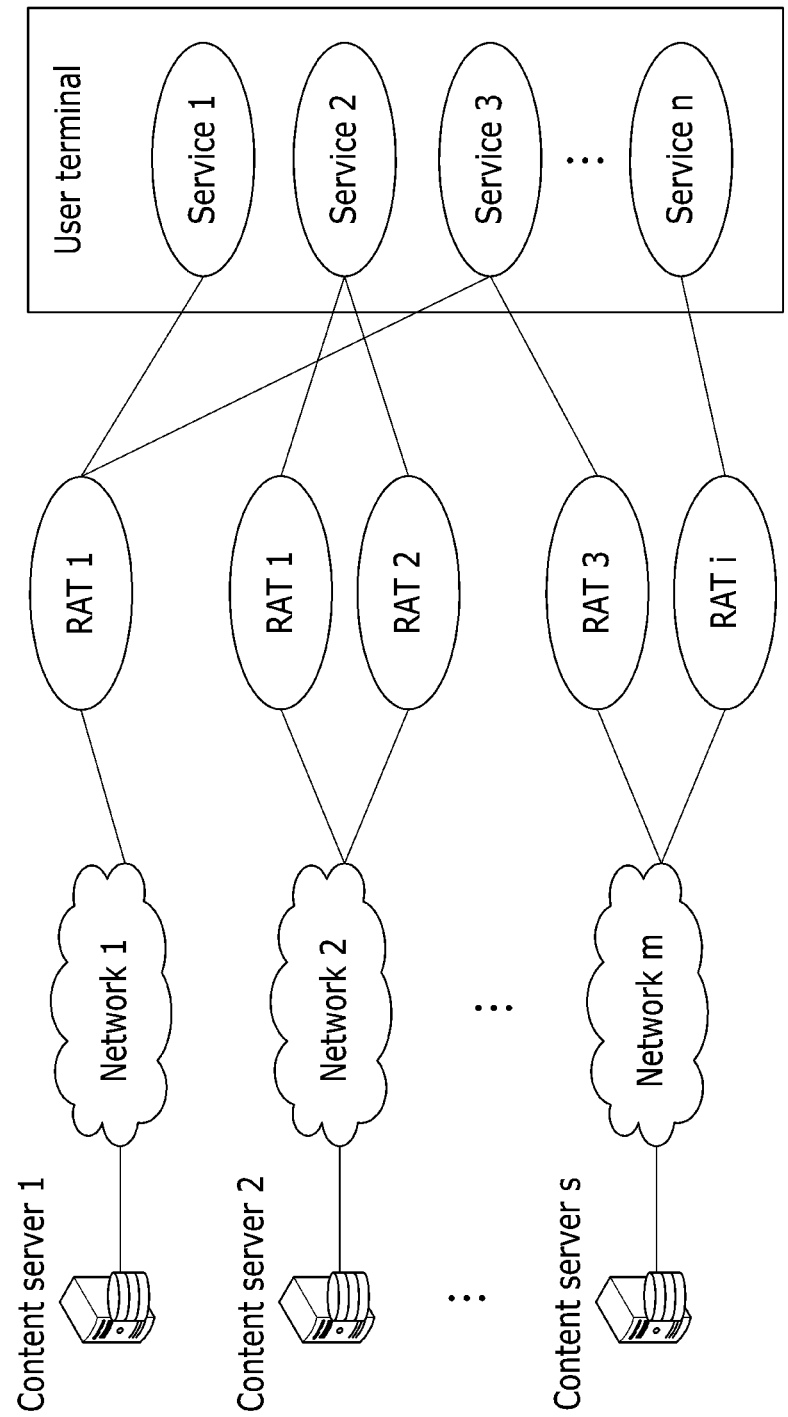
FIG. 3 is a view showing the provision of services through heterogeneous network access according to an exemplary embodiment of the present invention.

FIG. 3 is a view showing the provision of services through heterogeneous network access according to an exemplary embodiment of the present invention.

As shown in FIG. 3, a variety of services are provided in a heterogeneous network environment configured by different radio access technologies. A variety of services required by a terminal, i.e., a variety of services provided through content servers 1 to s, are provided to the terminal over a heterogeneous network configured by different RATs. The networks of FIG. 3 refer to different core networks to which RATs are connected. Examples of these networks may include a public network, a mobile communication provider's management network, a wired network, and a proximity network.

The terminal can access the most appropriate RAT for each service to receive service. More specifically, the terminal recognizes its user and its surrounding environment, and selects the most appropriate RAT for each service to receive service.

As shown in FIG. 3, the terminal accesses network 1 through RAT 1 to receive service 1 from content server 1, and accesses network 2 through RAT 1 or RAT 2 to receive service 2 from content server 2. The terminal accesses network 1 through RAT 1 to receive service 3 from content server 1, or accesses network m through RAT 3 to receive service 3 from content server s. The terminal accesses network m through RAT 1 to receive service n from content server s.

In the exemplary embodiment of the present invention, the terminal accesses a heterogeneous network through one of RAT transceivers that provide access via different RATs for each service according to RAT selection criteria to receive a service and deliver it to the user. Optionally, a service may be classified as one service group according to service classification criteria, and even the same service may be classified into different service groups.

First, a method and apparatus for accessing a base station according to a first exemplary embodiment of the present invention will be described.

Figure 4:
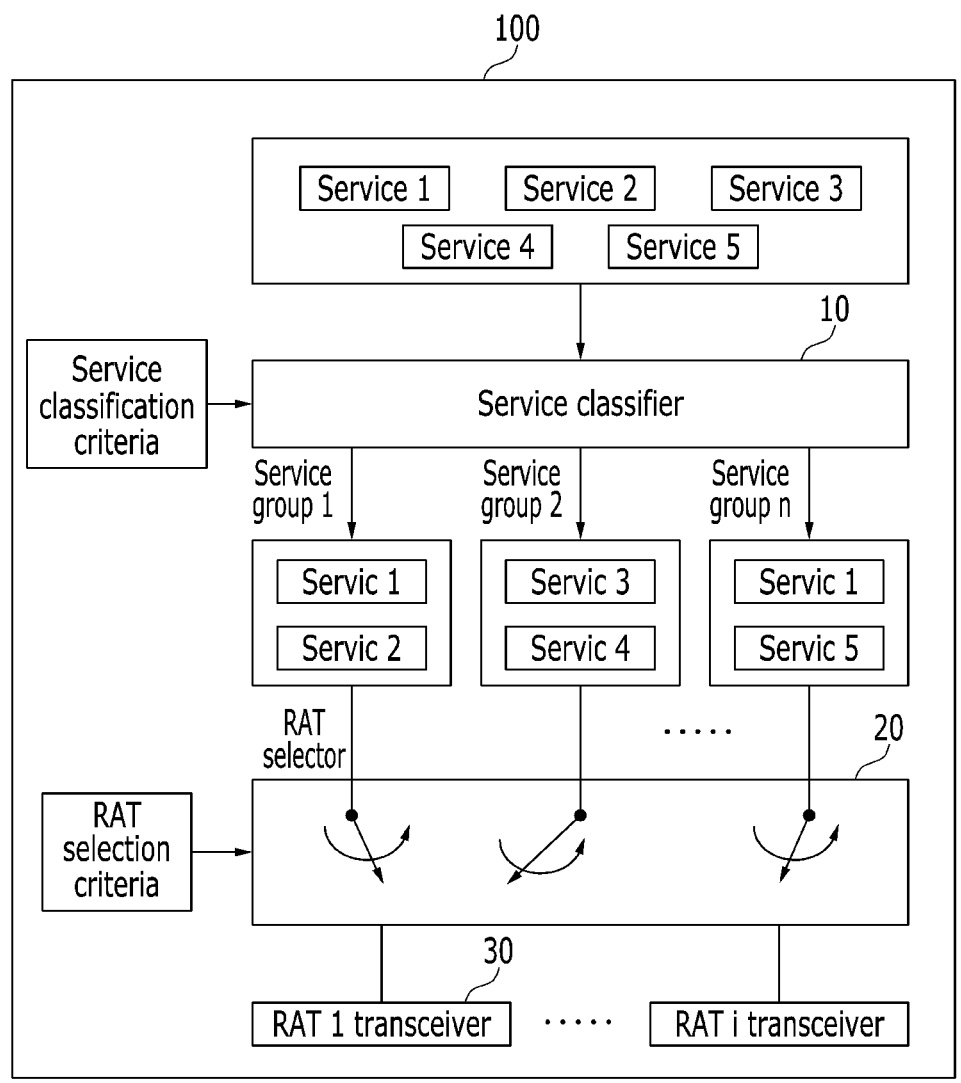
FIG. 4 is a view showing a structure of an apparatus for accessing a base station by service according to a first exemplary embodiment of the present invention.

FIG. 4 is a view showing a structure of the apparatus for accessing a base station by service according to the first exemplary embodiment of the present invention.

In the first exemplary embodiment of the present invention, a variety of services available on a terminal are classified into service groups according to service classification criteria, and the service groups are connected to a wireless network through a variety of RATs according to RAT selection criteria.

Specifically, services are classified into service groups according to service classification criteria such as time, location, service category, Quality of Experience information, and these service groups are connected to a wireless network through one of multiple RATs according to RAT selection criteria, which are set differently from or the same as the service classification criteria such as time, location, service category, and Quality of Experience information.

To this end, as shown in FIG. 4, an apparatus 100 for accessing a base station by service according to the first exemplary embodiment of the present invention includes a service classifier 10, a RAT selector 20, and a plurality of RAT transceivers (to which the reference numeral "30" is assigned for convenience of description).

The service classifier 10 classifies a plurality of services into service groups according to service classification criteria. For example, as shown in FIG. 4, services can be classified into service group 1, service group 2, and service group 3. Service 1 and service 2 are classified as service group 1, service 3 and service 4 are classified as service group 2, and service 1 and service 5 are classified as service group 3. Service 1 can be classified as falling into both service group 1 and service group 5.

The RAT selector 20 allows a service group to access the most appropriate RAT for each service according to the RAT selection criteria. That is, the RAT selector 20 allows a service group to be connected to one of the RAT transceivers 30. Accordingly, the services of the service group are provided through the most appropriate RAT transceiver which is selected taking into account the user and the surrounding environment.

The RAT transceivers 30 provide access through a predetermined RAT.

The terminal can access a heterogeneous network through one of the RAT transceivers to provide a plurality of services.

The access apparatus 100 may further include a reference information processor 40 that acquires information about parameters for service classification criteria and RAT selection criteria, and provides service classification criteria and RAT selection criteria based on this information.

Figure 5:
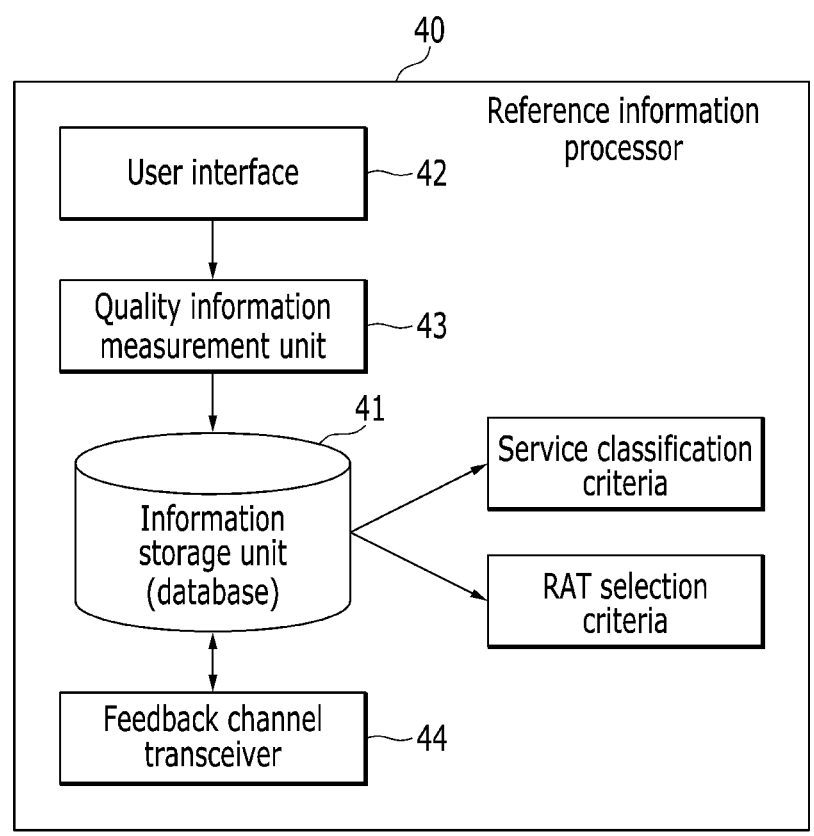
FIG. 5 is a view showing a structure of a reference information processor of the apparatus according to an exemplary embodiment of the present invention.

FIG. 5 is a view showing a structure of the reference information processor of the apparatus according to an exemplary embodiment of the present invention.

The reference information processor 30 acquires Quality of Experience information, one of the parameters for classification criteria, and processes it.

As shown in FIG. 5, the reference information processor 40 includes an information storage unit 41, and may further include a user interface 42, a quality information measurement unit 43, and a feedback channel transceiver 44.

The Quality of Experience information can be measured by direct input from the user or by the terminal's functional modules such as various sensors. The measured information can be stored as raw data in the information storage unit 41. Alternatively, output values from the user interface unit 42 can be processed through a preset QoP measurement algorithm and stored in the information storage unit 41. The information storage unit 41 can store the Quality of Experience information which is in the form of raw data or produced through the QoP measurement algorithm. The information storage unit 41 can be implemented as a database.

The user interface 42 receives a variety of output values related to the user's response action. The user interface 42 includes a variety of user interface devices the terminal has. The user's response action, for example, touch, sound, blow, shake, facial expression, input frequency, etc., is received through the user interface devices. The user's response action refers to an action indicating the user's response to the service provided through the terminal.

The quality information measurement unit 43 processes the output values from the user interface 42 through a preset QoP measurement algorithm to produce Quality of Experience information and store it in the information storage unit 41.

The Quality of Experience information processed and stored in the information storage unit 41 can be used to set service classification criteria and RAT selection criteria.

The Quality of Experience information can be transmitted to a heterogeneous network through the feedback channel transceiver 44. The feedback channel transceiver 44 periodically or non-periodically transmits the Quality of Experience information through a feedback channel upon a network request or as required by the user, and uses it to manage the load of the heterogeneous network, provide management service, and make use of base station resources for Quality of Experience improvement.

The thus-configured reference information processor 40 may not include the quality information measurement unit 43 if it processes and stores the Quality of Experience information as raw data. Moreover, the thus-configured reference information processor 40 may not include the feedback channel transceiver 44 if it does not provide the Quality of Experience information to the network.

The service classification criteria and RAT selection criteria provided by the reference information processor 40 include time, location, and service category. Alternatively, they may be set based on various information shown in FIG. 6.

Figure 6:
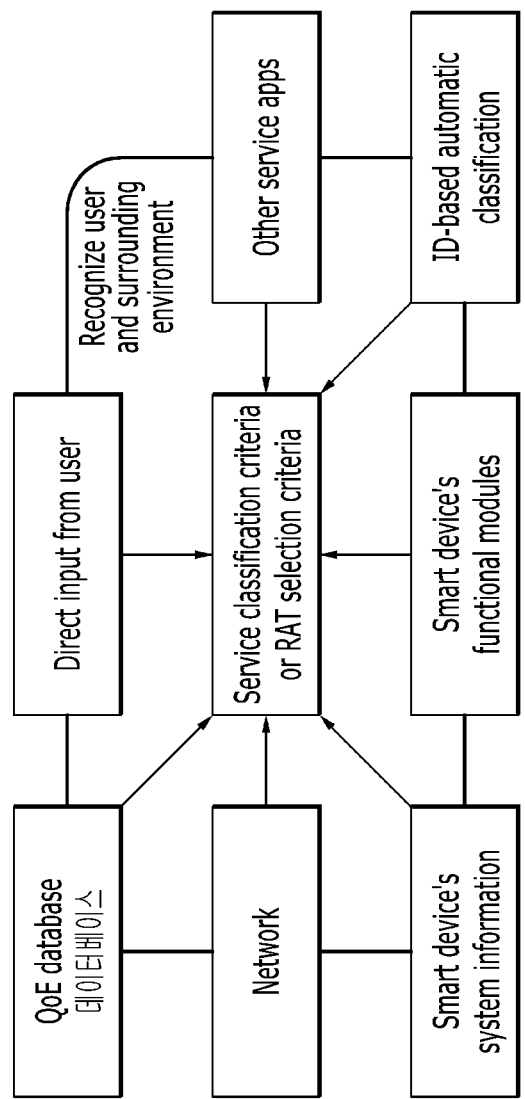
FIG. 6 is an illustration showing service classification criteria and RAT selection criteria which are set based on recognition of the user and the surrounding environment according to an exemplary embodiment of the present invention.

FIG. 6 is an illustration showing service classification criteria and RAT selection criteria which are set based on recognition of the user and the surrounding environment according to an exemplary embodiment of the present invention.

The service classification criteria and the RAT selection criteria may be set based on information for recognizing the user and the surrounding environment, as well as based on input of the information storage unit (database) 41 containing the Quality of Experience information.

As shown in FIG. 6, the service classification criteria and the RAT selection criteria service may include all information for recognizing the user or the surrounding environment, such as terminal location information such as GPS, time information, space information from a camera or the like, input from functional modules of a terminal such as a smartphone, input from a network, direct input from the user, an ID defined during the stage of development of a service application (app), an ID assigned by an app provider's site, an ID arbitrarily allocated to the terminal when downloading and installing an app, input from other service apps, and terminal system information.

For better comprehension and ease of description, the information for recognizing the user or the surrounding environment may be referred to as "user-related or surrounding environment-related information". The "user-related or surrounding environment-related information" may include various types of information as illustrated in FIG. 6.

Figure 7:
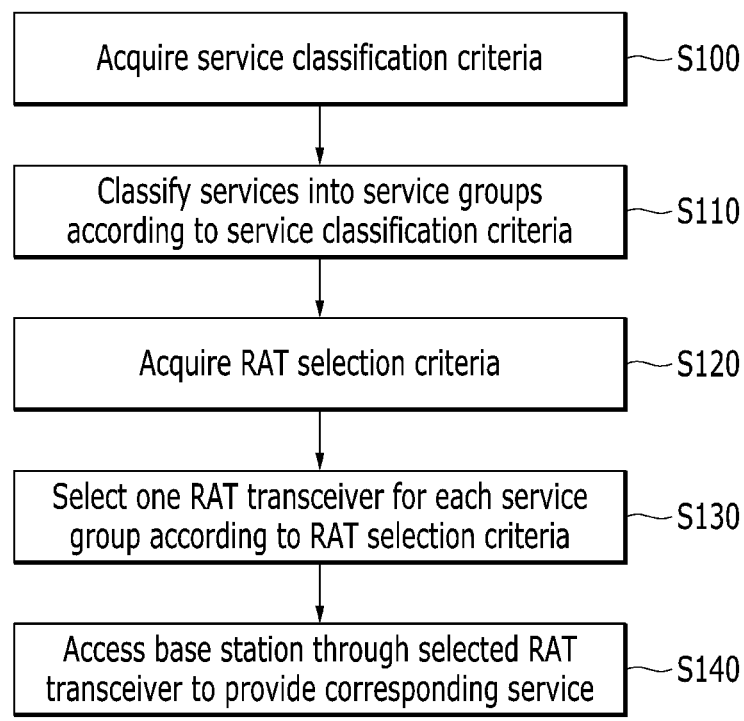
FIG. 7 is a flowchart of a method for accessing a base station by service according to the first exemplary embodiment of the present invention.

FIG. 7 is a flowchart of a method for accessing a base station by service according to the first exemplary embodiment of the present invention.

A terminal's access apparatus 100 classifies services that can be provided to the terminal by accessing the base station into service groups according to service classification criteria. The access apparatus 100 acquires parameters, e.g., time, location, service category, and Quality of Experience information, for the service classification criteria, and classifies services based on these parameters (S100 and S110).

After classifying the services provided through the terminal into service groups, the access apparatus 100 selects the most appropriate RAT transceiver for each service group according to RAT selection criteria. That is, one of RAT transceivers that provide access via different RATs for each service group according to RAT selection criteria is selected. Likewise, the access apparatus 100 acquires parameters, e.g., time, location, service category, and Quality of Experience information, for the RAT selection criteria, and selects a RAT transceiver for a service group (S120 and S130). If the RAT selection criteria and the service classification criteria are the same, the parameters acquired for the service classification criteria can be used as those for the RAT selection criteria.

Afterwards, upon a service request, the access apparatus 100 identifies the service group into which the corresponding service falls, and accesses the base station through the RAT transceiver for the identified service group to enable the provision of the corresponding service (S140).

Figure 8:
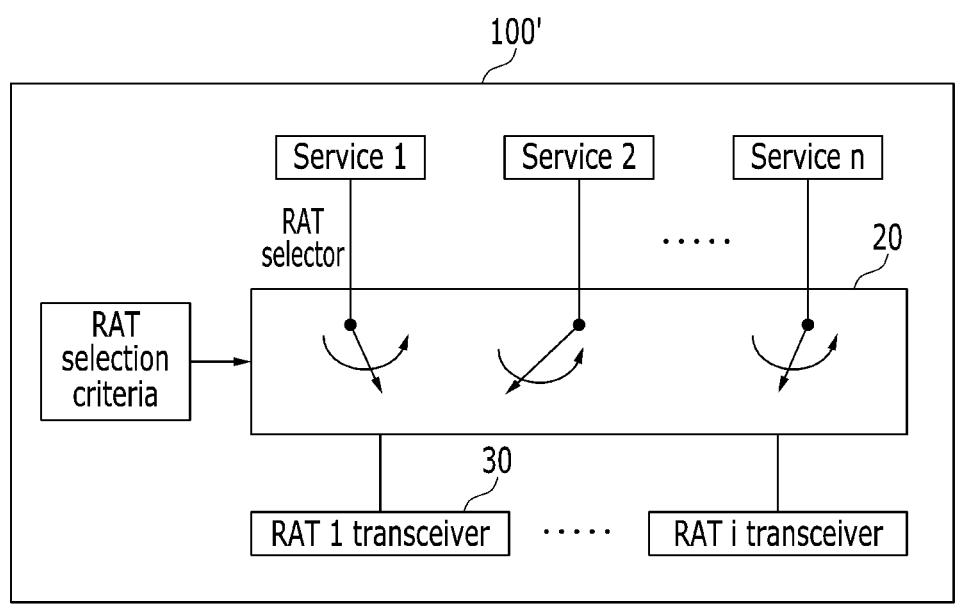
FIG. 8 is a view showing a structure of an apparatus for accessing a base station by service according to a second exemplary embodiment of the present invention.

FIG. 8 is a view showing a structure of an apparatus for accessing a base station by service according to a second exemplary embodiment of the present invention.

In the second exemplary embodiment of the present invention, a variety of services available on a terminal are provided without service group classification by accessing a heterogeneous network according to RAT selection criteria for each service. In the second exemplary embodiment, the RAT selection criteria may include time, location, service category, and Quality of Experience information, for example, as in the first exemplary embodiment.

As shown in FIG. 8, the apparatus 100' for accessing a base station by service according to the second exemplary embodiment of the present invention includes a RAT selector 20 and a plurality of RAT transceivers (to which the reference numeral "30" is assigned for convenience of description). As in the first exemplary embodiment, the access apparatus 100' may further include a reference information processor 40 as shown in FIG. 5. A detailed description of the reference information processor 40 will be omitted.

The RAT selector 20 allows each service to be connected to one of the RAT transceivers 30 according to RAT selection criteria. Accordingly, each service is provided through one RAT transceiver 30. For example, a plurality of services (services 1 to n) are each connected to one selected from transceivers based on different RATs according to RAT selection criteria, and each service is provided by accessing the base station through the selected RAT transceiver.

Figure 9:
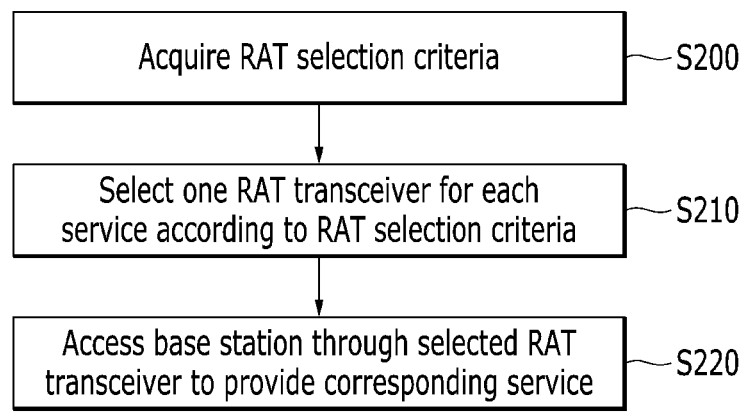
FIG. 9 is a flowchart of a method for accessing a base station by service according to the second exemplary embodiment of the present invention.

FIG. 9 is a flowchart of a method for accessing a base station by service according to the second exemplary embodiment of the present invention.

A terminal's access apparatus 100' selects one of RAT transceivers that provide access based on different RATs according to RAT selection criteria.

In this instance, the access apparatus 100' acquires parameters, e.g., time, location, service category, and Quality of Experience information, for the RAT selection criteria, and selects a RAT transceiver for a service group (S200 and S210).

Afterwards, upon a service request, the access apparatus 100' accesses the base station through the RAT transceiver selected for the corresponding service to enable the provision of the corresponding service (S220).

Figure 10:
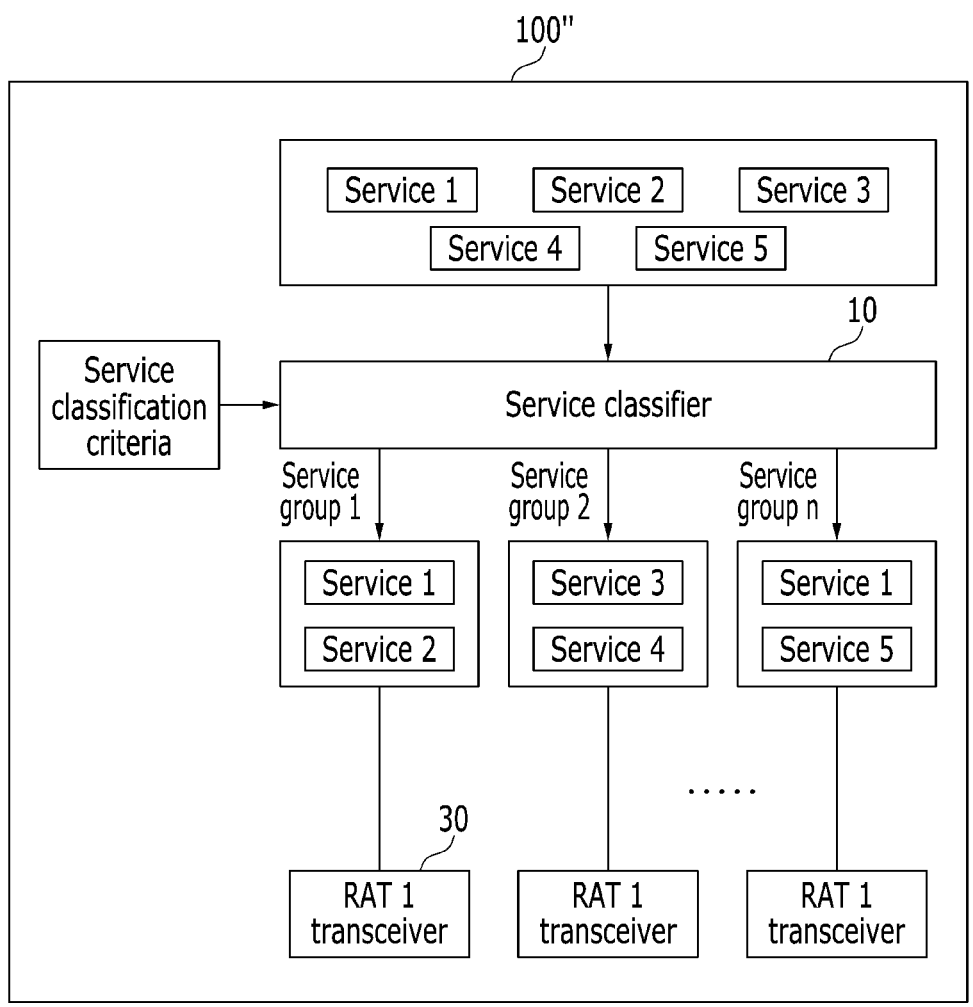
FIG. 10 is a view showing a structure of an apparatus for accessing a base station by service according to a third exemplary embodiment of the present invention.

FIG. 10 is a view showing a structure of an apparatus for accessing a base station by service according to a third exemplary embodiment of the present invention.

In the third exemplary embodiment of the present invention, a variety of services available on a terminal are classified into service groups, and a service is provided by accessing a heterogeneous network according to an RAT preset for the corresponding service group. The RAT preset for the corresponding service group may also be the most appropriate RAT transceiver selected according to RAT selection criteria according to an exemplary embodiment of the present invention. In the third exemplary embodiment, the service classification criteria and/or the RAT selection criteria may include time, location, service category, and Quality of Experience information, for example, as in the first exemplary embodiment.

As shown in FIG. 10, the apparatus 100" for accessing a base station by service according to the third exemplary embodiment of the present invention includes a service classifier 10 and a plurality of RAT transceivers (to which the reference numeral "30" is assigned for convenience of description). As in the first exemplary embodiment, the access apparatus 100" may further include a reference information processor 40 as shown in FIG. 5. A detailed description of the reference information processor 40 will be omitted.

The service classifier 10 classifies a plurality of services into service groups according to service classification criteria. For example, as shown in FIG. 9, services can be classified into service group 1, service group 2, and service group 3.

A RAT is preset for each service group. Accordingly, each service group is connected to a preset RAT transceiver 30. For example, a plurality of services (services 1 to n) are classified into service groups according to service classification criteria, each of them is connected to a transceiver based on a RAT preset for the corresponding service group, and each service is provided by accessing the base station through the preset RAT transceiver.

Figure 11:
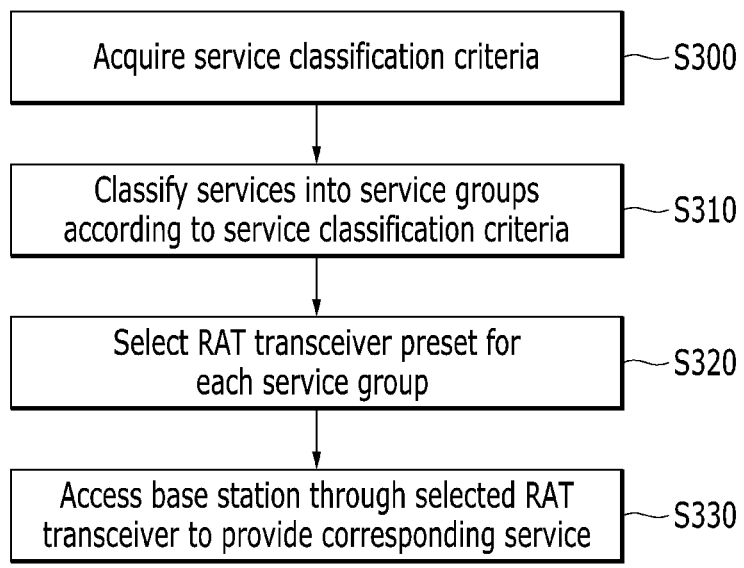
FIG. 11 is a method for accessing a base station by service according to the third exemplary embodiment of the present invention.

FIG. 11 is a method for accessing a base station by service according to the third exemplary embodiment of the present invention.

A terminal's access apparatus 100" classifies services that can be provided to the terminal by accessing the base station into service groups according to service classification criteria. The access apparatus 100" acquires parameters, e.g., time, location, service category, and Quality of Experience information, for the service classification criteria, and classifies services based on these parameters (S300 and S310).

After classifying the services provided through the terminal into service groups, the access apparatus 100" accesses the base station through a RAT transceiver preset for each service group. That is, upon a service request, the access apparatus 100" selects a RAT transceiver preset for the service group into which the corresponding service falls, and accesses the base station through the selected RAT transceiver to enable the provision of the corresponding service (S320 and S330).

Service provision is enabled based on the above-described methods and apparatuses for accessing a base station by service.

Figure 12:
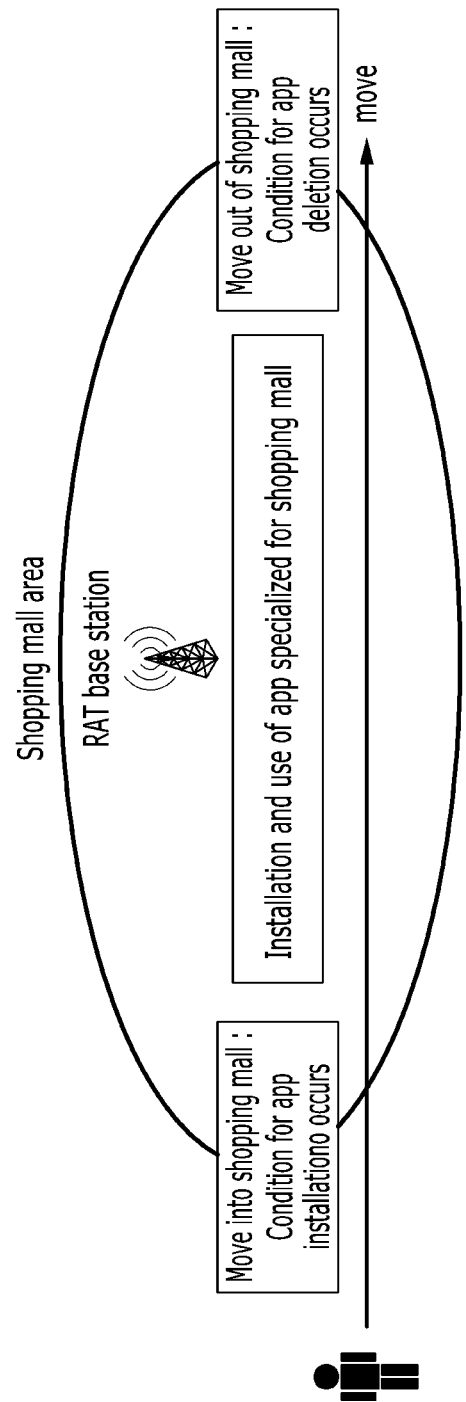
FIG. 12 is an illustration showing service provision based on a method for accessing a base station according to an exemplary embodiment of the present invention.

FIG. 12 is an illustration showing service provision based on a method for accessing a base station according to an exemplary embodiment of the present invention.

As shown in FIG. 12, service provision is enabled by accessing a heterogeneous network by service. For example, a particular service can be provided by location or time. The following description will be given by taking an app-based service as an example of the particular service.

In order to use an app-based service (e.g., app download service), the user usually accesses a particular site (e.g., app store) through their terminal, selects a particular app, and installs it on the terminal. In this instance, the app is always on the terminal unless the user deletes the app.

In the exemplary embodiment of the present invention, as shown in FIG. 6, when a condition for app installation or activation occurs, like when a terminal is in a shopping mall, a particular app associated with the shopping mall is installed with the user's consent or automatically to enable service provision or the particular app associated with the shopping mall previously installed on the terminal is activated to enable service provision. When a condition for app deletion or deactivation occurs, like when the terminal moves out of the shopping mall, the app may be automatically deleted or the activated app may be deactivated.

Time, as well as location like a shopping mall, can also be used as the condition for app installation or activation or the condition for app deletion or deactivation. During particular hours, an app can be installed on the terminal with the user's consent or automatically, or the previously installed app can be activated. During hours except for the particular hours, the app automatically installed on the terminal can be deleted, or the activated app can be deactivated.

If a plurality of conditional parameters (location and time) are included for the condition for app installation or activation or the condition for app deletion or deactivation, a combined condition can be created by performing an operation (e.g., AND or OR operation) on these conditional parameters.

Figure 13:
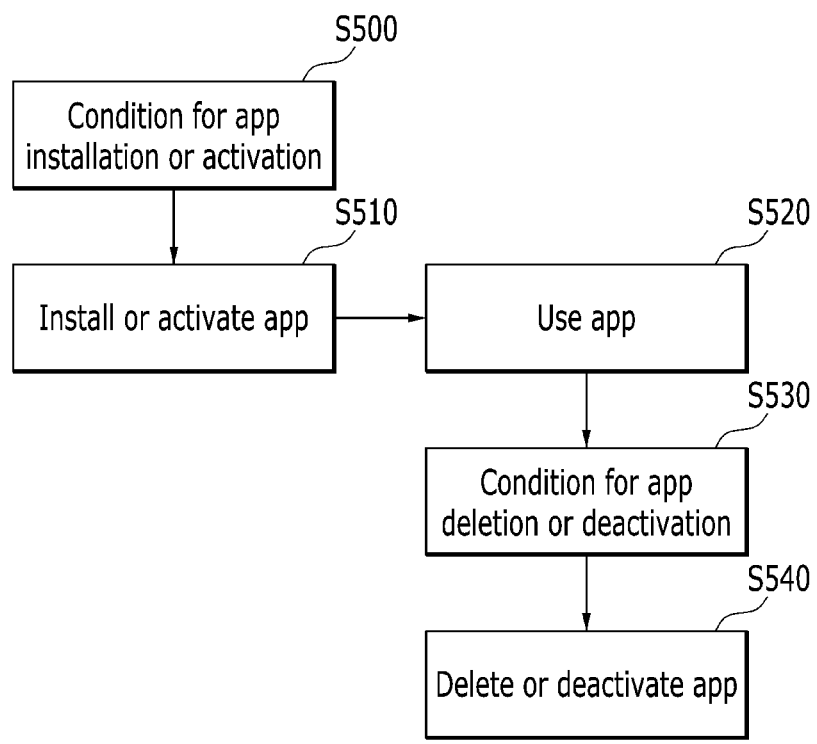
FIG. 13 is a flowchart showing service provision based on a method for accessing a base station according to an exemplary embodiment of the present invention.

FIG. 13 is a flowchart showing service provision based on a method for accessing a base station according to an exemplary embodiment of the present invention.

As shown in FIG. 13, when a condition for app installation or activation occurs while a terminal is accessing a base station through a particular RAT based on the above-described base station access method, the app is provided and installed, or the existing app previously installed on the terminal is activated (S500 and S510). The condition for app installation or activation may include at least one of the aforementioned conditional parameters such as location and time. When the condition for app installation or activation occurs, additional information about whether to install the app with the user's consent or automatically with or without the user's consent can be used. Based on this additional information, the terminal installs the app with the user's consent or automatically when the condition for app installation or activation occurs.

The user is able to use the app through the terminal (S520). Afterwards, when a condition for app deletion or deactivation occurs, the app installed on the terminal is deleted or the activated app is deactivated (S530 and S40). While the installed app is deleted automatically in this instance, it may be deleted with the user's consent if necessary.

The access apparatus according to the exemplary embodiment of the present invention may be implemented as a computer system, that is, a computer-readable medium.

Figure 14:
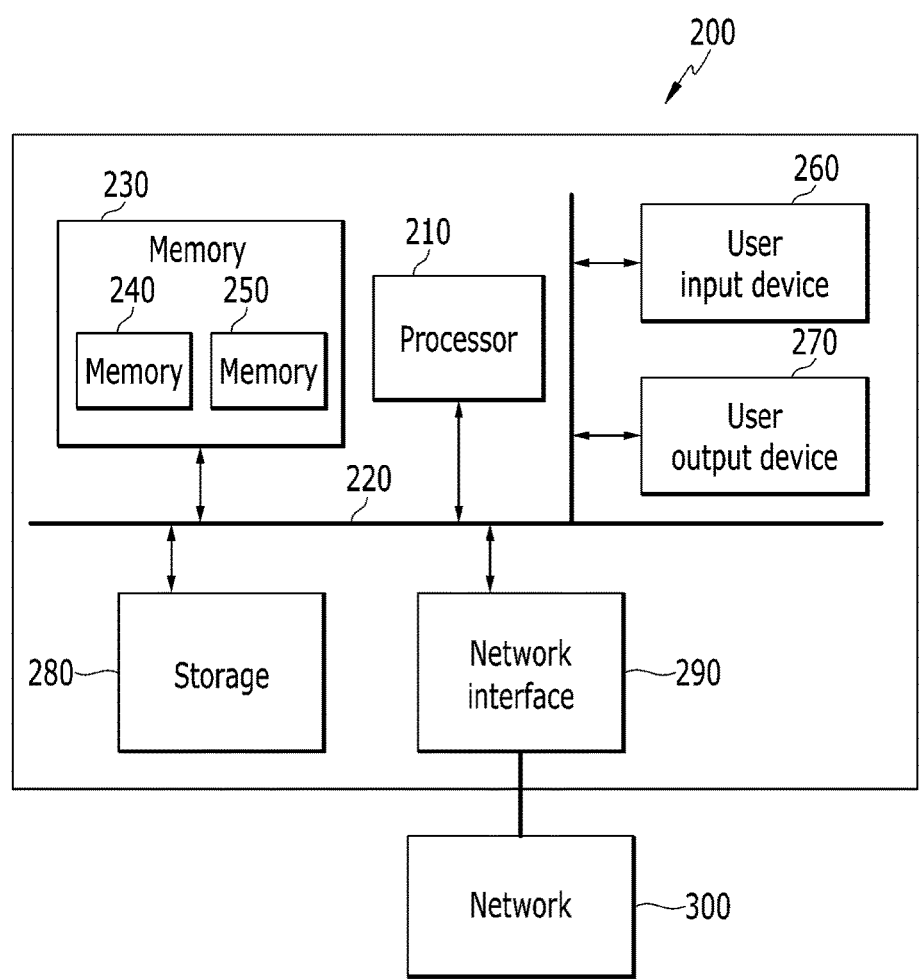
FIG. 14 is a view showing a structure of an apparatus for accessing a base station by service according to another exemplary embodiment of the present invention.

FIG. 14 is a view showing a structure of an apparatus for accessing a base station by service according to another exemplary embodiment of the present invention.

The access apparatus, that is, a computer system 200, includes at least one processor 210, a memory 230, a user input device 260, a user output device 270, and storage 280. Each of them can communicate via a bus 220.

The computer system 200 may further include a network interface 290 connected to a network 300.

The processor 210 may be a CPU (central processing unit) or a semiconductor device that executes instructions stored in the memory 230 or storage 280, or a semiconductor device. The processor 210 may be configured to implement the above-stated procedures and methods explained based on FIGS. 2 to 14.

The memory 230 and the storage 280 may be various types of volatile or non-volatile storage media: for example, the memory 230 may be ROM (read-only memory) 240 or RAM (random access memory) 250.

According to an exemplary embodiment of the present invention, a terminal can access the most appropriate base station to enable service provision in a heterogeneous network environment. Particularly, a terminal in a heterogeneous network can classify services based on time, location, service category, and Quality of Experience information and provide them through different RATs, which enables the terminal to have access through the most appropriate RAT (Radio Access Technology) for each service and allows a wireless network provider to make extra profits from the provision of customized services based on Quality of Experience information. Moreover, time-based and regionally-based small-sized content providers can offer diversified services over wireless networks of their own.

The embodiments of the present invention may not necessarily be implemented only through the foregoing devices and/or methods, but may also be implemented through a program for realizing functions corresponding to the configurations of the embodiments of the present invention, a recording medium storing the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a terminal to access a base station in a heterogeneous network environment, the method comprising:

acquiring RAT (Radio Access Technology) selection criteria based on reference information;
selecting, for each service available on the terminal, at least one of multiple transceivers associated with the RAT that provide access to the base station according to the RAT selection criteria; and
providing the corresponding service by accessing the base station through the selected transceiver, wherein
the RAT selection criteria is the same as the reference information,
the selected one among the multiple transceivers for a service depends on the reference information, and
the reference information comprises at least one of QoE (Quality of Experience) information, service category, time, and location.

2. The method of claim 1, wherein the QoE (Quality of Experience) information comprises QoS (Quality of Service), which describes technical performance factors including at least one of data rate, delay, packet loss, and jitter, and QoP (Quality of Perception), which describes non-technical performance factors.

3. The method of claim 1, wherein the reference information further comprises information user-related or surrounding environment-related information, and the user-related or surrounding environment-related information comprises at least one of the following: terminal location information, time information, space information, input from functional modules of the terminal, input from a network, direct input form the user, an ID defined during the stage of development of a service application (app), an ID assigned by an app provider's site, an ID arbitrarily allocated to the terminal when downloading and installing an app, input from other service apps, and terminal system information.

4. The method of claim 1, further comprising:
acquiring service classification criteria; and
classifying services available on the terminal into service groups according to the service classification criteria, and
in the selecting of a transceiver, at least one of the multiple transceivers that provide access to the base station is selected for each service group according to the RAT selection criteria.

5. The method of claim 4, wherein, in the selecting of a transceiver, a transceiver preset for each service group is selected for access to the base station according to the RAT selection criteria.

6. The method of claim 4, wherein the service classification criteria and the RAT selection criteria are the same.

7. A method for a terminal to access a base station in a heterogeneous network environment, the method comprising:
acquiring RAT (Radio Access Technology) selection criteria based on reference information;
selecting, for each service available on the terminal, at least one of multiple transceivers associated with the RAT that provide access to the base station according to the RAT selection criteria; and
providing the corresponding service by accessing the base station through the selected transceiver, wherein the providing of a service comprises:
in response to the service being an app-based service, downloading and installing the app on the terminal or activating the existing app previously installed on the terminal in response to a condition for app installation or activation occurring; and
in response to a condition for app deletion or deactivation occurring after the installation or activation of the app, deleting the app installed on the terminal or deactivating the activated app.

8. The method of claim 7, wherein the condition for app installation or activation and the condition for app deletion or deactivation comprises at least either location or time.

9. The method of claim 8, wherein:
in the activating, in response to the terminal being in a location included in the condition for app installation or activation or the current time corresponding to a time included in the condition for app installation or activation, the app is downloaded and installed on the terminal, or the existing app is activated; and
in the deactivating, in response to the terminal being in a location included in the condition for app deletion or deactivation or the current time corresponding to a time included in the condition for app deletion or deactivation, the app installed on the terminal is deleted, or the activated app is deactivated.

10. A method for a terminal to access a base station in a heterogeneous network environment, the method comprising:
acquiring service classification criteria based on reference information;
classifying services available on the terminal into service groups according to the service criteria;
selecting at least one transceiver preset for each service group according to the service criteria; and
accessing the base station through the selected transceiver and providing the corresponding service,
wherein the service classification criteria is the same as the reference information,
the selected at least one transceiver for a service depends on the reference information, and
the reference information comprises at least one of QoE (Quality of Experience) information, service category, time, and location.

11. The method of claim 10, wherein the reference information further comprises user-related or surrounding environment-related information, and the user-related or surrounding environment-related information comprises at least one of the following: terminal location information, time information, space information, input from functional modules of the terminal, input from a network, direct input form the user, an ID defined during the stage of development of a service application (app), an ID assigned by an app provider's site, an ID arbitrarily allocated to the terminal when downloading and installing an app, input from other service apps, and terminal system information.

12. An apparatus for a terminal to access a base station in a heterogeneous network environment, the apparatus comprising:
a reference information processor that provides RAT (Radio Access Technology) selection criteria and service classification criteria based on reference information;
a service classifier that classifies a plurality of services available on the terminal into service groups based on the service classification standard;
a plurality of transceivers that provide access to the base station according to different RATs; and
an RAT selector that selects at least one of the transceivers associated with the RAT for each service group according to the RAT selection criteria, wherein the RAT selection criteria and the service classification criteria are the same as the reference information, the selected at least transceiver for a service depends on the reference information, and the reference information comprises at least one of QoE (Quality of Experience) information, service category, time, and location.

13. The apparatus of claim 12, wherein the reference information further comprises user-related or surrounding environment-related information, and the user-related or surrounding environment-related information comprises at least one of the following: terminal location information, time information, space information, input from functional modules of the terminal, input from a network, direct input form the user, an ID defined during the stage of development of a service application (app), an ID assigned by an app provider's site, an ID arbitrarily allocated to the terminal when downloading and installing an app, input from other service apps, and terminal system information.

14. The apparatus of claim 12, wherein the QoE (Quality of Experience) information comprises QoS (Quality of Service), which describes technical performance factors including at least one of data rate, delay, packet loss, and jitter, and QoP (Quality of Perception), which describes non-technical performance factors.

15. The apparatus of claim 12, wherein the reference information processor comprises:

an information storage unit that stores the reference information;

a user interface that receives output values related to the user's response action; and a quality information measurement unit that processes the output values through a preset measurement algorithm to produce QoE (Quality of Experience) information and store the same in the information storage unit.

16. The apparatus of claim 15, wherein the information storage unit stores information measured by sensors installed on the terminal as raw data and uses the same as the reference information.

17. The method of claim 1, wherein the RAT selection criteria comprises at least one of QoE (Quality of Experience) information, service category, time, and location.

* * * * *